(12) United States Patent
Dockser (10) Patent No.: US 9,146,706 B2
(45) Date of Patent: Sep. 29, 2015

(54) CONTROLLED-PRECISION ITERATIVE ARITHMETIC LOGIC UNIT

(75) Inventor: Kenneth Alan Dockser, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 2822 days.

(21) Appl. No.: 11/381,870

(22) Filed: May 5, 2006

(65) Prior Publication Data
US 2007/0260662 A1   Nov. 8, 2007

(51) Int. Cl.
G06F 7/499 (2006.01)
G06F 7/537 (2006.01)
G06F 7/483 (2006.01)

(52) U.S. Cl.
CPC ............ *G06F 7/49942* (2013.01); *G06F 7/537* (2013.01); *G06F 7/483* (2013.01); *G06F 7/49947* (2013.01); *G06F 2207/382* (2013.01)

(58) Field of Classification Search
USPC .................. 708/495, 497, 513, 504, 650–656
See application file for complete search history.

(56) References Cited

U.S. PATENT DOCUMENTS

| | | | | |
|---|---|---|---|---|
| 3,434,114 A | * | 3/1969 | Arulpragasam et al. | 712/222 |
| 3,626,427 A | * | 12/1971 | MacSorley et al. | 712/244 |
| 4,173,789 A | * | 11/1979 | Miura | 708/632 |
| 4,276,607 A | * | 6/1981 | Wong | 708/628 |
| 4,823,260 A | | 4/1989 | Imel | |
| 4,839,846 A | * | 6/1989 | Hirose et al. | 708/497 |
| 5,128,889 A | | 7/1992 | Nakano | |
| 5,249,149 A | | 9/1993 | Cocanougher et al. | |
| 5,268,855 A | | 12/1993 | Mason | |
| 5,276,634 A | | 1/1994 | Suzuki et al. | |
| 5,329,475 A | * | 7/1994 | Juri et al. | 708/551 |
| 5,481,686 A | * | 1/1996 | Dockser | 712/222 |

(Continued)

FOREIGN PATENT DOCUMENTS

| | | |
|---|---|---|
| EP | 0377992 A2 | 7/1990 |
| JP | 3245226 A | 10/1991 |

(Continued)

OTHER PUBLICATIONS

Harris, D., "An Exponentiation unit for an OpenGL Lighting Engine"; IEEE Transactions on Computers, IEEE Service Center, Los Alamitos, CA, US, vol. 53, No. 3, Mar. 2004, pp. 251-258, XP011106099, ISSN: 0018-9340.

(Continued)

*Primary Examiner* — Chuong D Ngo
*Assistant Examiner* — Matthew Sandifer
(74) *Attorney, Agent, or Firm* — Peter Michael Kamarchik; Nicholas J. Pauley; Paul Holdaway (57) ABSTRACT

A controlled-precision Iterative Arithmetic Logic Unit (IALU) included in a processor produces sub-precision results, i.e. results having a bit precision less than full precision. In one embodiment, the controlled-precision IALU comprises an arithmetic logic circuit and a precision control circuit. The arithmetic logic circuit is configured to iteratively process operands of a first bit precision to obtain a result. The precision control circuit is configured to end the iterative operand processing when the result achieves a programmed second bit precision less than the first bit precision. In one embodiment, the precision control circuit causes the arithmetic logic circuit to end the iterative operand processing in response to an indicator received by the control circuit. The controlled-precision IALU further comprises rounding logic configured to round the sub-precision result.

27 Claims, 5 Drawing Sheets

(56) References Cited

U.S. PATENT DOCUMENTS

| | | | |
|---|---|---|---|
| 5,557,563 A * | 9/1996 | Larri | 708/620 |
| 6,029,243 A * | 2/2000 | Pontius et al. | 712/222 |
| 6,108,772 A * | 8/2000 | Sharangpani | 712/221 |
| 6,173,303 B1 * | 1/2001 | Avigdor et al. | 708/620 |
| 6,487,575 B1 | 11/2002 | Oberman | |
| 6,490,607 B1 | 12/2002 | Oberman | |
| 2003/0212726 A1 | 11/2003 | Luick | |
| 2008/0140744 A1 * | 6/2008 | Shadich | 708/209 |

FOREIGN PATENT DOCUMENTS

| | | |
|---|---|---|
| JP | 4055936 A | 2/1992 |
| JP | 4357522 A | 12/1992 |
| JP | 2004310432 A | 11/2004 |
| RU | 2004104325 | 5/2006 |
| TW | 199927 A | 2/1993 |
| WO | WO95/31767 | 11/1995 |
| WO | WO2004/075043 | 9/2004 |

OTHER PUBLICATIONS

P-M Seidel, "On the Design of IEEE Compliant Floating-Point Units and Their Quantitative Analysis" Dissertation Zur Erlangung Des Grades Doktor Der Ingenieurwissenschaften, 1999, Xp002477155, pp. 119-180.

International Search Report—PCT/US07/067119, International Search Authority—European Patent Office—May 6, 2008.

Seidel P-M: "High-Radix Implementation of IEEE Floating-Point Addition" Computer Arithmetic, 2005. Arith-17 2005. 17th IEEE Symposium on Cape Cod, MA, USA Jun. 27-29, 2005, Piscataway, NJ, USA, IEEE, Jun. 25, 2005, pp. 99-106.

Written Opinion—PCT/US07/067119, International Search Authority—European Patent Office—May 6, 2008.

Taiwan Search Report—TW096115621—TIPO—Jan. 4, 2011.

* cited by examiner

CONTROLLED-PRECISION ITERATIVE ARITHMETIC LOGIC UNIT

FIELD

The present disclosure generally relates to processors, and particularly relates to performing sub-precision iterative arithmetic operations in a processor.

BACKGROUND

Conventional processors include one or more arithmetic logic units for performing iterative operations such as divide, square root and transcendental (e.g., SIN, COS) operations. Iterative arithmetic operations are conventionally executed until a result is produced that has a fixed, defined bit precision. That is, operands are iteratively processed to produce a result having full precision, i.e., a target precision such as the precision associated with a result register or a precision associated with the starting operands. For example, the Institute of Electrical and Electronics Engineers (IEEE) has defined a standard associated with binary floating-point arithmetic, often referred to as IEEE 754. The IEEE 754 standard specifies number formats, basic operations, conversions, and exceptional conditions relating to both single and double precision floating-point operations.

IEEE 754 compliant floating-point numbers include three basic components: a sign bit, an exponent, and a mantissa. The mantissa is further broken up into an integer portion and a fraction portion. Only the fraction bits are stored in the encoding. For normal numbers, the integer portion is implicitly equal to the value of 1. IEEE 754 compliant single precision numbers are represented by a sign bit, an 8-bit exponent and a 23-bit fraction while double precision numbers are represented by a sign bit, an 11-bit exponent and a 52-bit fraction. As such, iterative processing of IEEE 754 compliant floating-point numbers produces results having 24-bit precision for single-precision operands and 53-bit precision for double-precision operands. For example, a processor equipped with a single-precision IEEE 754 compliant ALU produces results having a full precision of 24 bits. However, certain applications, such as openGL compliant graphics applications, may not require results having full 24-bit single precision. As such, unnecessary power and processing cycle consumption occurs by calculating results to full 24-bit single precision for applications that can tolerate something less than full single precision, e.g., 16-bit precision.

Some conventional processors produce results having a precision less than that of the target format. However, these processors terminate iterative arithmetic operations short of the target format only when the operands being acted on have a precision less than the target format. For example, a double-precision processor can perform a single-precision operation on single-precision operands, producing a single-precision result, even when the target register format is that of a double-precision value. As such, some conventional arithmetic processes are operand-precision dependent, and thus, produce results having a full precision equivalent to that of the operands. As a result, power and processor cycles may be unnecessarily consumed to produce results having a precision greater than that which may be tolerable or acceptable for certain applications.

SUMMARY OF THE DISCLOSURE

According to the methods and apparatus taught herein, a controlled-precision Iterative Arithmetic Logic Unit (IALU) included in a processor produces sub-precision results, i.e. results having a bit precision less than full precision. In one or more embodiments, the controlled-precision IALU comprises an arithmetic logic circuit and a precision control circuit. The arithmetic logic circuit is configured to iteratively process operands of a first bit precision to obtain a result. The precision control circuit is configured to end the iterative operand processing when the result achieves a programmed second bit precision less than the first bit precision. As is the case for full-precision operations, reduced precision operations may produce more bits than are needed in the final result to enable proper rounding. These "rounding bits" are commonly referred to as guard, round, and sticky bits. In one embodiment, the precision control circuit causes the arithmetic logic circuit to end the iterative operand processing in response to an indicator received by the control circuit. The controlled-precision IALU further comprises rounding logic configured to conditionally increment the result at the least significant bit (LSB) of a sub-precision result based on the rounding mode, the LSB and the rounding bits. In one embodiment, the rounding logic is configured to round the result by aligning a rounding value with the LSB of the result and conditionally adding the aligned rounding value to the result.

Thus, in at least one embodiment, sub-precision results are generated in a processor by iteratively processing operands of a first bit precision to obtain a result and ending the iterative operand processing when the result achieves a programmed second bit precision less than the first bit precision. Further, the width of the sub-precision results may be adjusted by padding the result so that the padded result has a bit width corresponding to the first bit precision.

In another embodiment, a processor comprises the controlled-precision IALU. The processor further comprises a storage element configured to store the programmed second bit precision as a fixed value or as a dynamically alterable value. If the programmed second bit precision is stored as a dynamically alterable value, it may be modified responsive to one or more instructions received by the processor. The controlled-precision IALU is configured to end iterative operand processing responsive to an indicator received by the processor. In one embodiment, the indicator is a flag bit stored in a register included in the processor.

Of course, the present disclosure is not limited to the above features. Those skilled in the art will recognize additional features upon reading the following detailed description, and upon viewing the accompanying drawings.

DETAILED DESCRIPTION

Figure 1:
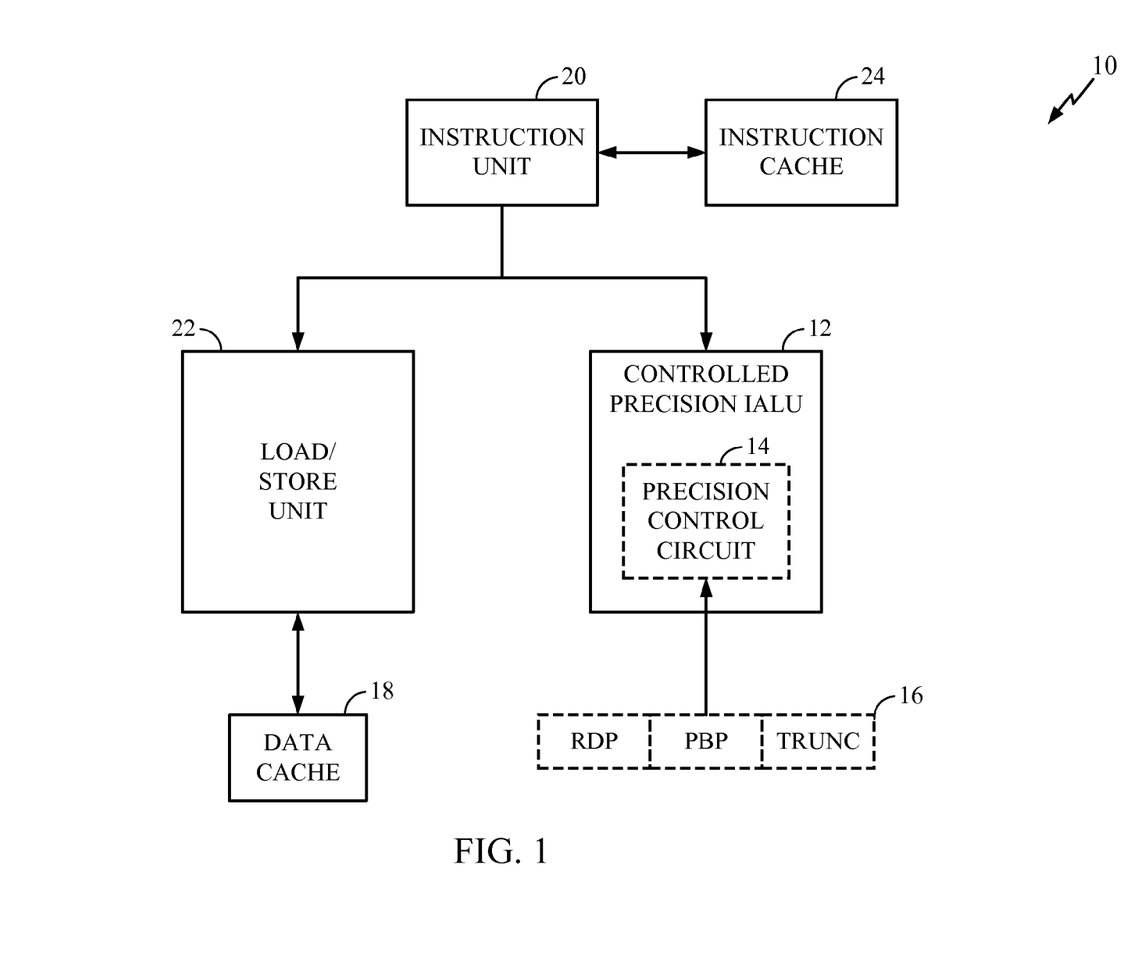
FIG. 1 is a block diagram illustrating an embodiment of a processor including a controlled-precision Iterative Arithmetic Logic Unit (IALU).

FIG. 1 illustrates an embodiment of a processor 10 including one or more controlled-precision Iterative Arithmetic Logic Units (IALUs) 12. The controlled-precision IALU 12, under control of a precision control circuit 14 included in or associated with the IALU 12, is configured to end iterative arithmetic processing before results produced by the IALU 12 obtain full precision. That is, in response to a Programmed Bit Precision (PBP) value received by the precision control circuit 14, the control circuit 14 causes the IALU 12 to generate sub-precision results, i.e., results having a bit precision less than a target precision such as the precision associated with a result register or a precision associated with the starting operands. The PBP value indicates a desired bit precision associated with results generated by the IALU 12. As such, the precision control circuit 14, in response to the PBP value, may cause the IALU 12 to end operand processing before the result obtains full precision. The sub-precision result produced by the IALU 12 thus has a bit precision corresponding to the PBP value and not full precision. The PBP value may be saved in a storage element included in the processor 10, e.g., a special or general purpose register 16 or data cache memory 18. In one embodiment, the PBP value is hard-wired, and thus is not reprogrammable. In another embodiment, the PBP value is a dynamically alterable value stored in the PBP register 16 or the data cache 18, and is thus modifiable. The PBP value may be provided to the processor 10 as part of an instruction or series of instructions, e.g., as part of a very-long instruction word.

Regardless of how the PBP value is generated, stored, or modified, the precision control circuit 14 uses the PBP value to control whether the controlled-precision IALU 12 is to terminate iterative arithmetic operations early, i.e., before the result achieves full precision. Unlike conventional techniques, the precision control circuit 14 may cause the IALU 12 to terminate iterative arithmetic operations before a result obtains full precision regardless of operand precision. Instead, the precision control circuit 14 bases its early termination logic on the PBP value, which is not directly associated with the precision of an operand. As a result, the controlled-precision IALU 12 is capable of generating sub-precision results irrespective of operand precision, thereby reducing power consumption and improving performance of the processor 10 when the processor 10 is executing applications that can tolerate sub-precision results, e.g., graphics applications.

The processor 10 further includes an instruction unit 20, one or more load/store units 22, and an instruction cache 24. The instruction unit 20 provides centralized control of instruction flow to various execution units such as the load/store unit 22 and the controlled-precision IALU 12. The execution units may execute multiple instructions in parallel. As such, the processor 10 may be superscalar and/or super-pipelined. The instruction and data caches 18, 24 enable system registers (not shown) and the execution units to rapidly access instructions and data. Further, data may be moved between the data cache 18 and the system registers via one of the execution units, e.g. the load/store unit 22.

Figure 2:
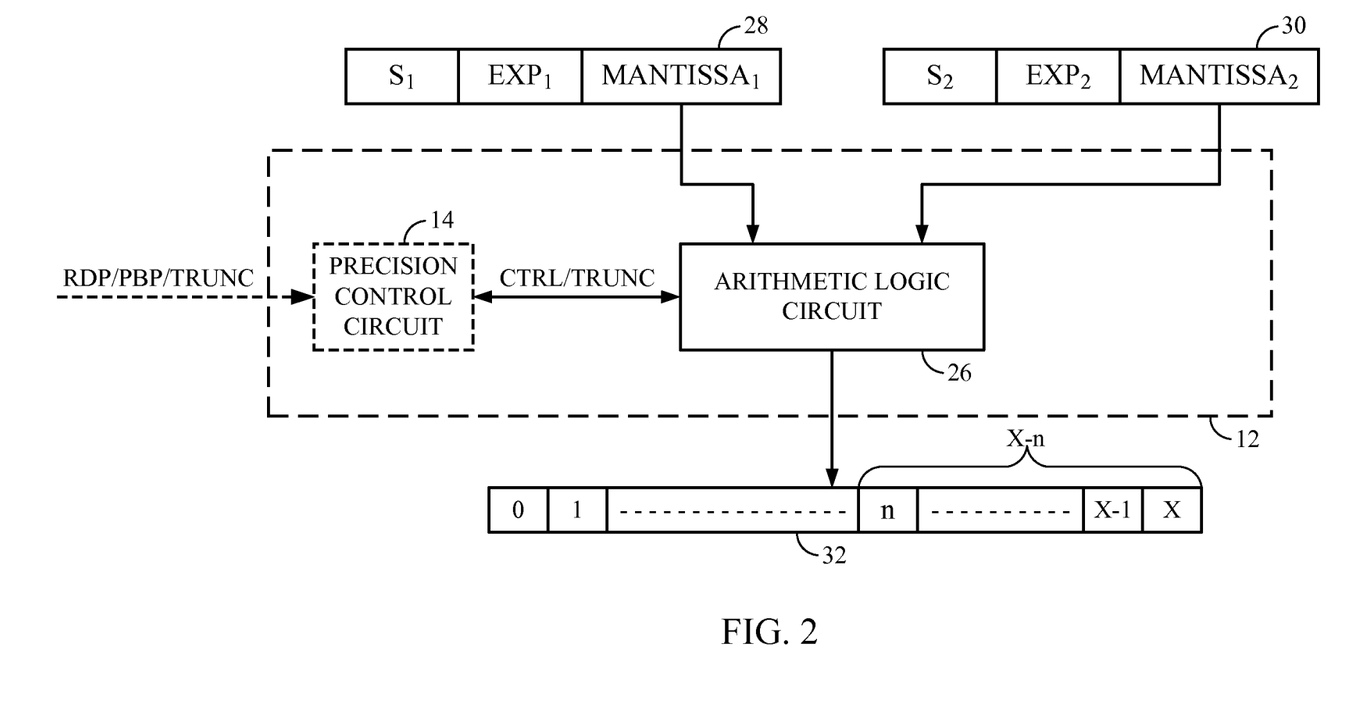
FIG. 2 is a block diagram illustrating an embodiment of the controlled-precision IALU of FIG. 1.

FIG. 2 illustrates one embodiment of the controlled-precision IALU 12. In this embodiment, the IALU 12 includes an arithmetic logic circuit 26. The arithmetic logic circuit 26 is configured to perform iterative arithmetic operations such as divide, square root and transcendental functions. The arithmetic logic circuit 26 receives operands from registers 28, 30 included in the processor 10. In one example, the operands are IEEE 754 single-precision compliant, and thus, each register 28, 30 stores a sign bit, an 8-bit exponent and a 23-bit fraction. In another example, the operands are IEEE 754 double-precision compliant, and thus, each register 28, 30 stores a sign bit, an 11-bit exponent and a 52-bit fraction. In other examples, the operands have a full precision different than the IEEE 754 standards, such as operands sufficient for the openGL standard or custom applications.

For ease of explanation only, detailed operation of the controlled-precision IALU 12 is next described with reference to operands having a full precision that corresponds to IEEE 754 single-precision (herein referred to generally as single precision). However, those skilled in the art will readily understand that the one or more embodiments of the controlled-precision IALU 12 are fully capable of processing operands having any bit precision, and thus, can end iterative arithmetic operations short of full precision irrespective of what precision defines full precision.

Figure 3:
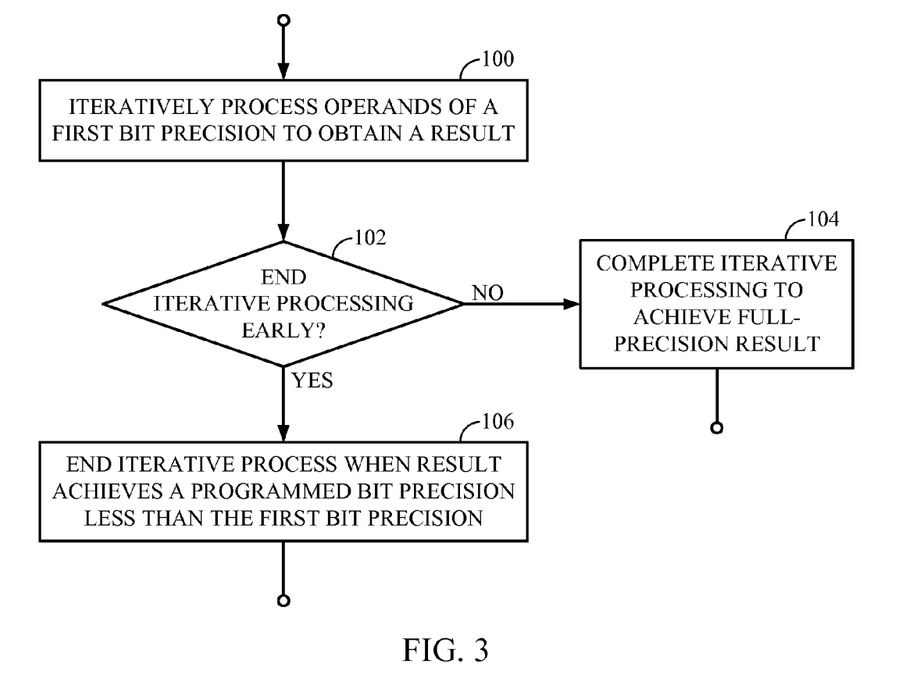
FIG. 3 is a logic flow diagram illustrating an embodiment of program logic for performing an iterative arithmetic operation.

Returning to FIG. 2, the arithmetic logic circuit 26 iteratively processes single precision operands received from the operand registers 28, 30, as shown in Step 100 of FIG. 3. The precision control circuit 14, in response to the contents of the PBP register 16 or one or more instructions, will either allow the arithmetic logic circuit 26 to complete iterative processing uninterrupted or will cause the arithmetic logic circuit 26 to perform an "early-out termination" by ending iterative processing before obtaining a full-precision result, as shown in Step 102 of FIG. 3. As part of the information received from the PBP register 16 or as provided by one or more instructions, the precision control circuit 14 receives an indicator (RDP) that determines whether the arithmetic logic circuit 26 is to end processing early, i.e., produce a sub-precision result. In one embodiment, the indicator is a flag bit set in the PBP register 16. If the indicator is not set, then the precision control circuit 14 allows the arithmetic logic circuit 26 to iterate to full single precision, thereby producing a full-precision result, as shown by Step 104 of FIG. 3. However, if the indicator is set, then the precision control circuit 14 activates a control signal (CTRL), causing the arithmetic logic circuit 26 to stop iteration when enough bits are generated for a desired sub-precision, including any rounding bits that are needed, thereby producing a sub-precision result, as shown by Step 106 of FIG. 3.

The PBP value indicates a bit precision of the result at which the precision control circuit 14 causes the arithmetic logic circuit 26 to end processing. For example, if the PBP value indicates a bit precision of 16 bits, then the precision control circuit 14 causes the arithmetic logic circuit 26 to stop iterating when the intermediate result has enough bits to produce a properly rounded result with a bit precision of 16 bits.

In one embodiment, an RDP bit without a PDP value is utilized to produce a sub-precision result of a predetermined size. In an alternative embodiment, the PDP value without an RDP bit is utilized to also enable the reduced precision operation.

In one embodiment, the precision control circuit 14 comprises a state machine or a counter to track the number of arithmetic iterations performed. As such, the precision control circuit 14 monitors arithmetic logic circuit processing. When the arithmetic logic circuit 26 produces an intermediate result having enough bits to produce a properly rounded result with a bit precision matching the PBP value, the precision control circuit 14 activates the control signal, thereby causing the arithmetic logic circuit 26 to end processing. For example, the precision control circuit 14 counts the number of processing cycles performed by the arithmetic logic circuit 26, causing the arithmetic logic circuit 26 to end processing when the count indicates that the bit precision of the final result will match that of the PBP value.

The controlled-precision IALU 12 stores the generated result in a result register 32 included in the processor 10. The result register 32 has a sufficient bit width for storing full precision results. For single precision results, the register 32 contains 23 bit positions for storing a full-precision fraction result (where x=23). The arithmetic logic circuit 26 may pad sub-precision results when storing the result in the register 32, thus ensuring that the contents of the register 32 have a padded bit width corresponding to full precision. In one embodiment, the arithmetic logic circuit 26 pads a sub-precision result by appending a sufficient quantity of logic zero bits to the result such that the padded sub-precision result has a bit width equivalent to full precision. The IALU 12 may store sub-precision results in the result register 32, however, x-n register bits will not be valid where n=the bit position one significance greater than the PBP value. Alternatively, the IALU 12 stores sub-precision results in another result register (not shown) where the bit width of the other register corresponds to the PBP value.

The arithmetic logic circuit 26 may truncate one or more operand least significant bits (LSBs) so that the truncated operands have a bit precision less than full operand precision and greater than or equal to the precision associated with the PBP value. The arithmetic logic circuit 26 truncates one or more operand LSBs in response to a truncate value (TRUNC) received from the precision control circuit 14. The precision control circuit 14 obtains the truncate value from either the PBP register 16 or from one or more instructions. In one example, the arithmetic logic circuit 26 truncates one or more operand LSBs by masking the operand LSB(s).

Figure 4:
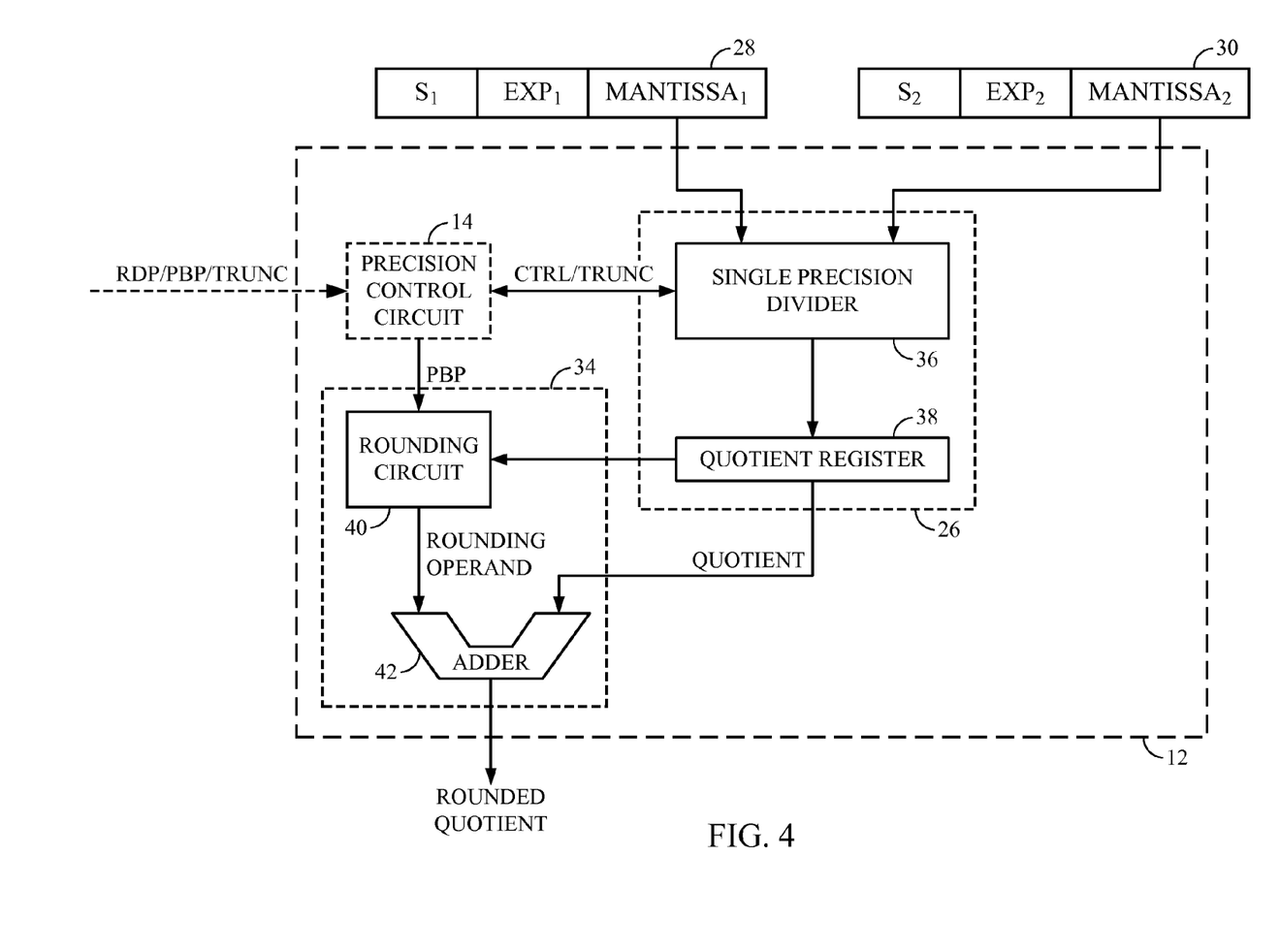
FIG. 4 is a block diagram illustrating an embodiment of the controlled-precision IALU of FIG. 1 further comprising a rounding circuit.

FIG. 4 illustrates another embodiment of the controlled-precision IALU 12, where the IALU 12 further includes rounding logic 34 for rounding results produced by the arithmetic logic circuit 26. In this embodiment, the arithmetic logic circuit 26 comprises a single precision divider 36 and a quotient register 38 for temporarily holding quotient results. Conventional rounding logic implements one or more rounding algorithms for deleting LSB(s) of a result and adjusting the retained bits. For example, conventional rounding logic implements one or more of or the following rounding algorithms: round to nearest even, round-to-zero, round-up, and/or round-down. Guard, round and sticky bits may be used to assist in the rounding process. However, conventional rounding circuits have difficulty rounding sub-precision results. This is particularly so when the bit precision associated with sub-precision results changes, e.g., in response to dynamic alterations of the PBP value, thus causing the LSB, guard, round and sticky bits of the result to move positions.

Figure 5:
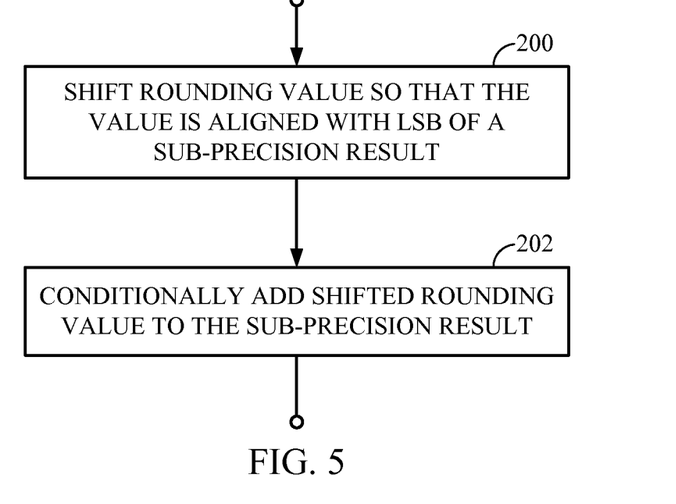
FIG. 5 is a logic flow diagram illustrating an embodiment of program logic for rounding a sub-precision result produced by the controlled-precision IALU of FIG. 4.

The rounding logic 34 included in the controlled-precision IALU 12 accounts for the bit precision associated with sub-precision results, including dynamically alterable bit precisions, by identifying the LSB of a particular sub-precision result. The rounding logic 34 accounts for the LSB of a sub-precision result by aligning a rounding value with the LSB, thus enabling proper rounding of the result. The rounding logic 34 includes a rounding circuit 40 and an adder 42. The rounding circuit 40 processes the PBP value to determine which bit position associated with a particular result is to be conditionally incremented. For example, the rounding circuit 40, in response to the PBP value, identifies the LSB of the result stored in the quotient register 38 that is to be conditionally incremented. In one embodiment, the rounding circuit 40 comprises a shifter. The shifter moves or shifts a rounding value so that the rounding value is aligned with the LSB(s) of a particular sub-precision result, as illustrated by Step 200 of FIG. 5. The rounding value may be aligned by shifting a logic one value to a bit position corresponding to a LSB of the PBP value. As such, the rounding value comprises a bit pattern having all logic zeros except for the bit position corresponding to the LSB of the corresponding result. The shifted rounding value is then provided to the adder 42 as an operand. A sub-precision result produced by the arithmetic logic circuit 26 functions as the other operand, e.g., a result stored in the quotient register 38. The adder 42 conditionally adds the shifted rounding value to the result generated by the arithmetic logic circuit 26 to produce an accurately rounded result, as illustrated by Step 202 of FIG. 5. Those skilled in the art will appreciate that the result may be rounded based on the LSB, guard, round and sticky bits in conjunction with the rounding mode using one of various known conditional incrementing techniques, each of which is within the scope of the embodiments disclosed herein.

Figure 6:
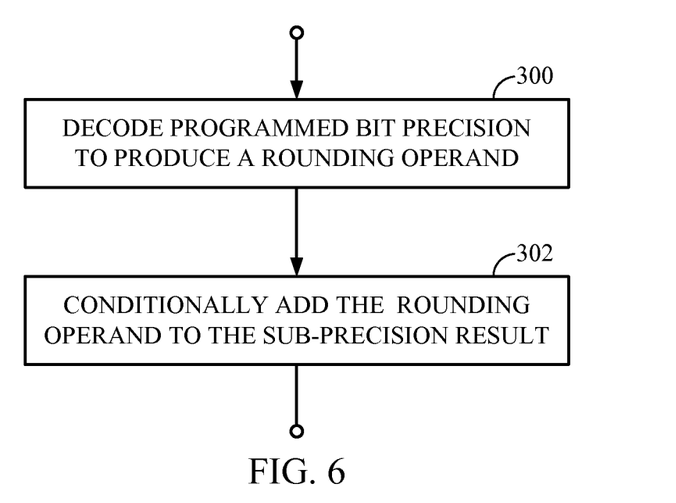
FIG. 6 is a logic flow diagram illustrating another embodiment of program logic for rounding a sub-precision result produced by the controlled-precision IALU of FIG. 4.

In another embodiment, the rounding circuit 40 comprises a decoder for aligning a rounding value with the LSB(s) of a sub-precision result, thus enabling proper rounding of the result. The decoder receives the PBP value and generates a rounding value corresponding to the PBP value, as illustrated by Step 300 of FIG. 6. In one embodiment, the rounding value comprises a bit pattern having all logic zeros except for the bit position corresponding to the LSB of the PBP value. The bit position of the rounding value that corresponds to the LSB of the PBP value comprises a logic one. The rounding value is then provided to the adder 42 as an operand and a result produced by the arithmetic logic circuit 26 functions as the other operand. The adder 42 conditionally adds the rounding value to the result generated by the arithmetic logic circuit 26 to produce an accurately rounded result, as illustrated by Step 302 of FIG. 6. Thus, by either properly shifting a rounding value or decoding the PBP value to produce a rounding operand and conditionally adding the rounding operand to a corresponding result, the controlled-precision IALU 12 is capable of producing accurate sub-precision results.

With the above range of variations and applications in mind, it should be understood that the present disclosure is not limited by the foregoing description, nor is it limited by the accompanying drawings. Instead, the present disclosure is limited only by the following claims and their legal equivalents.

What is claimed is:

1. A method of performing an iterative arithmetic operation in a processor, comprising:
 iteratively processing operands of a first bit precision to obtain a result;
 ending the iterative processing when the result achieves a programmed second bit precision less than the first bit precision: and
 rounding the result;
 wherein rounding the result comprises:
  aligning a rounding value with a least significant bit (LSB) of the result; and
  conditionally adding the aligned rounding value to the result;
 wherein aligning the rounding value with the LSB of the result comprises:
  shifting the rounding value so that the rounding value has a logic one located at a bit position corresponding to the LSB of the result.

2. The method of claim 1, further comprising padding the result so that the padded result has a bit width corresponding to the first bit precision.

3. The method of claim 2, wherein padding the result so that the padded result has a bit width corresponding to the first bit precision comprises appending one or more logic zero bits to the result.

4. The method of claim 1, further comprising storing the result in a register having a bit width less than the first bit precision.

5. The method of claim 1, further comprising
receiving operands of a third bit precision having a bit width greater than the first precision; and
truncating one or more least significant bits (LSBs) of the operands of the third bit precision before beginning the iterative processing so that the truncated operands are the operands of the first bit precision and have a bit precision greater than the programmed second bit precision.

6. The method of claim 5, wherein truncating one or more of the operand LSBs comprises masking one or more of the operand LSBs.

7. The method of claim 1, wherein aligning the rounding value with the LSB of the result comprises decoding the second programmed bit precision to produce a rounding operand.

8. The method of claim 1, further comprising modifying the programmed second bit precision responsive to a change in contents of a register included in the processor.

9. The method of claim 1, further comprising modifying the programmed second bit precision responsive to one or more instructions received by the processor.

10. An iterative arithmetic logic unit for use in a processor, comprising:
an arithmetic logic circuit configured to iteratively process operands of a first bit precision to obtain a result;
a precision control circuit configured to end the iterative processing when the result achieves a programmed second bit precision less than the first bit precision: and
rounding logic configured to round the result;
wherein the rounding logic is configured to round the result by aligning a rounding value with a least significant bit (LSB) of the result and conditionally adding the aligned rounding value to the result; and
wherein the rounding logic is configured to align the rounding value with the LSB of the result by shifting the rounding value so that the rounding value has a logic one located at a bit position corresponding to the LSB of the result.

11. The iterative arithmetic logic unit of claim 10, wherein the arithmetic logic circuit is further configured to pad the result so that the padded result has a bit width corresponding to the first bit precision.

12. The iterative arithmetic logic unit of claim 11, wherein the arithmetic logic circuit is configured to pad the result so that the padded result has a bit width corresponding to the first bit precision by appending one or more logic zero bits to the result.

13. The iterative arithmetic logic unit of claim 10, wherein the arithmetic logic circuit is further configured to receive operands of a third bit precision having a bit width greater than the first precision; and
truncate one or more least significant bits (LSBs) of the operands of the third bit precision so that the truncated operands are the operands of the first bit precision and have a bit precision greater than the programmed second bit precision.

14. The iterative arithmetic logic unit of claim 13, wherein the arithmetic logic circuit is configured to truncate one or more of the operand LSBs by masking one or more of the operand LSBs.

15. The iterative arithmetic logic unit of claim 10, wherein the rounding logic is configured to align the rounding value with the LSB of the result by decoding the second programmed bit precision to produce a rounding operand.

16. The iterative arithmetic logic unit of claim 10, wherein the precision control circuit is configured to end the iterative processing responsive to an indicator received by the precision control circuit.

17. A processor comprising an iterative arithmetic logic unit configured to iteratively processes operands of a first bit precision to obtain a result and end the iterative processing when the result achieves a programmed second bit precision less than the first bit precision;
wherein the iterative arithmetic logic unit is further configured to:
round the result by aligning a rounding value with a least significant bit (LSB) of the result and conditionally adding the aligned rounding value to the result; and
align the rounding value with the LSB of the result by shifting the rounding value so that the rounding value has a logic one located at a bit position corresponding to the LSB of the result.

18. The processor of claim 17, wherein the iterative arithmetic logic unit is further configured to pad the result so that the padded result has a bit width corresponding to the first bit precision.

19. The processor of claim 17, further comprising a register for storing the result, the register having a bit width less than the first bit precision.

20. The processor of claim 17, wherein the iterative arithmetic logic unit is configured to align the rounding value with the LSB of the result by decoding the second programmed bit precision to produce a rounding operand.

21. The processor of claim 17, further comprising a storage element configured to store the programmed second bit precision as a fixed value or as a dynamically alterable value.

22. The processor of claim 21, wherein the stored dynamically alterable value is modified responsive to one or more instructions received by the processor.

23. The processor of claim 17, wherein the arithmetic logic unit ends the iterative processing responsive to an indicator received by the processor.

24. The processor of claim 23, wherein the indicator comprises a flag bit stored in a register included in the processor.

25. The method of claim 1, wherein ending the iterative processing when the result achieves a programmed second bit precision less than the first bit precision comprises:
selecting a value of the programmed second bit precision without regard to the value of the first bit precision.

26. The method of claim 1 further comprising:
counting the number of processing cycles performed by the iterative process; and
determining a cycle count corresponding to the programmed second bit precision.

27. An iterative arithmetic logic unit for use in a processor, comprising:
means for iteratively processing operands of a first bit precision to obtain a result;
means for ending the iterative processing when the result achieves a programmed second bit precision less than the first bit precision: and
means for rounding the result;

wherein the means for rounding is configured to round the result by aligning a rounding value with a least significant bit (LSB) of the result and conditionally adding the aligned rounding value to the result; and wherein the means for rounding is configured to align the rounding value with the LSB of the result by shifting the rounding value so that the rounding value has a logic one located at a bit position corresponding to the LSB of the result.

\* \* \* \* \*